United States Patent [19]
Shibahata

[11] Patent Number: 6,131,054
[45] Date of Patent: Oct. 10, 2000

[54] YAW MOMENT CONTROL SYSTEM IN VEHICLE

[75] Inventor: Yasuji Shibahata, Wako, Japan

[73] Assignee: Honda Giken Kogyo Kabushiki Kaisha, Tokyo, Japan

[21] Appl. No.: 08/968,234

[22] Filed: Nov. 12, 1997

[30] Foreign Application Priority Data

Nov. 13, 1996 [JP] Japan ..................................... 8-301519
Nov. 13, 1996 [JP] Japan ..................................... 8-301520

[51] Int. Cl.$^7$ ............................... G05D 1/00; G05D 3/00; G06F 7/00
[52] U.S. Cl. ................................. 701/1; 701/41; 701/69; 701/72; 180/197; 180/252; 303/146
[58] Field of Search .................................. 701/1, 29, 41, 701/69, 70, 72, 84, 88; 340/444; 180/197, 233, 247, 248, 249, 252, 410, 411, 414, 415; 303/146

[56] References Cited

U.S. PATENT DOCUMENTS

| 5,192,929 | 3/1993 | Walker et al. ........................... 340/444 |
| 5,197,008 | 3/1993 | Itoh et al. .................................. 701/70 |
| 5,343,741 | 9/1994 | Nishihara et al. ...................... 73/146.2 |
| 5,346,032 | 9/1994 | Sasaki ....................................... 701/69 |
| 5,752,575 | 5/1998 | Konishi et al. ........................... 701/84 |
| 5,866,812 | 2/1999 | Nishihara et al. ...................... 73/146.2 |

FOREIGN PATENT DOCUMENTS

| 0 546 733 A1 | 6/1993 | European Pat. Off. . |
| 9-86203 | 3/1997 | Japan . |
| 2 280 157 | 1/1995 | United Kingdom . |

Primary Examiner—William A. Cuchlinski, Jr.
Assistant Examiner—Gertrude Arthur
Attorney, Agent, or Firm—Arent Fox Kintner Plotkin & Kahn, PLLC

[57] ABSTRACT

A yaw moment control system is provided to eliminate an under-steering tendency generated due to the insufficiency of a cornering force of front driven wheels of a vehicle. More specifically, in place of a longitudinal acceleration Xg and a lateral acceleration Yg used for calculating the amount of torque distributed, a corrected longitudinal acceleration Xg' larger than the value directly proportional to the longitudinal acceleration Xg and a corrected lateral acceleration Yg' larger than the value directly proportional to the lateral acceleration Yg are used, thereby increasing the amount of torque distributed to between inner and outer wheels during turning of the vehicle. A yaw moment is generated which is directed inwards in the turning direction to prevent the under-steering tendency which is generated due to the insufficiency of the cornering force of the front wheels.

8 Claims, 9 Drawing Sheets

YAW MOMENT CONTROL SYSTEM IN VEHICLE

BACKGROUND OF THE INVENTION

1. Field of the Invention

The present invention relates to a yaw moment control system in a vehicle, in which the steering characteristic is changed by distributing different amounts of torque to left and right wheels.

2. Description of Related Art

There is a conventionally known yaw moment control system in a vehicle which has already been proposed by the present assignee and which is designed to control the yaw moment by generating a driving force in one of the left and right wheels of the vehicle which are connected to each other by a gear box and a torque transmitting clutch, and by generating a braking force in the other wheel. An undesirable yaw moment generated upon acceleration or deceleration of the vehicle which is being turned, is eliminated by setting the distribution amounts of the driving force and the braking force as a function of a product of the longitudinal acceleration and the lateral acceleration (see Japanese Patent Application Laid-open No. 9-86203).

As known by the theory of a tire friction circle, a grip force applied to the grounded face of a tire is composed of a longitudinal driving force (a braking force) and a lateral cornering force. The resultant force cannot exceed a static friction force on the grounded face.

Therefore, if a driving force is applied to the front wheels which are the driven wheels to increase the longitudinal acceleration during the turning of a front wheel drive vehicle at or near the limit of the grip force of the tire, the cornering forces of the front wheels are decreased in accordance with the increase in the longitudinal acceleration. The vehicle which is being turned is maintained in stability about a yaw axis by the balance between the cornering force of the front wheels and the cornering force of the rear wheels. For this reason, there is a problem that a front portion of the vehicle is pushed outwards in the turning direction due to the above-described decrease in the cornering force of the front wheels to thereby intensify an under-steering tendency. Especially, if the grip force of the tire has reached its limit, thereby causing the slip rate to be increased, the driving force is slowly decreased, whereas the cornering force is rapidly decreased, and for this reason, the under-steering tendency rises significantly.

In contrast, if the driving force is applied to the rear wheels which are driven wheels, to increase the longitudinal acceleration during turning of a rear wheel drive vehicle at or near the limit of the grip force of a tire, the cornering force of the rear wheels is decreased in accordance with the increase in the longitudinal acceleration. The vehicle which is being turned is maintained in stability about the yaw axis by the balance between the cornering force of the front wheels and the cornering force of the rear wheels. For this reason, there is a problem that a rear portion of the vehicle is pushed outwards in the turning direction due to the above-described decrease in the cornering force of the rear wheels to thereby intensify an over-steering tendency. Especially, if the grip force of the tire has reached its limit, thereby causing the slip rate to be increased, the driving force is slowly decreased, whereas the cornering force is rapidly decreased, and for this reason, the over-steering tendency rises substantially.

SUMMARY OF THE INVENTION

Accordingly, it is an object of the present invention to properly compensate for the under-steering tendency or the over-steering tendency produced in the vehicle which is being turned.

To achieve the above object, according to a first aspect and feature of the present invention, there is provided a yaw moment control system in a vehicle, comprising left and right front wheels as driven wheels, left and right rear wheels as follower wheels, and a torque distributing means for distributing torque between the left and right front wheels and/or between the left and right rear wheels. A longitudinal acceleration calculating means calculates the longitudinal acceleration of the vehicle, and a torque distribution amount determining means controls the amount of torque distributed by the torque distributing means, such that it is increased in accordance with an increase in the calculated longitudinal acceleration. The torque distribution amount determining means is adapted to increase the amount of torque distributed to a value which is larger than the value directly proportional to the longitudinal acceleration.

With the above arrangement, the cornering force of the front wheel is decreased in accordance with an increase in longitudinal acceleration of the vehicle, i.e., in accordance with an increase in the driving force for the front wheel, and even if the vehicle falls into an unintended under-steering tendency, the under-steering tendency can be compensated for by further increasing the amount of torque distributed to the left and right wheels.

According to a second aspect and feature of the present invention, there is provided a yaw moment control system in a vehicle, comprising left and right front wheels as driven wheels, left and right rear wheels as follower wheels, and a torque distributing means for distributing torque between the left and right front wheels and/or between the left and right rear wheels. A lateral acceleration calculating means calculates a lateral acceleration of the vehicle, and a torque distribution amount determining means controls the amount of torque distributed by the torque distributing means, such that it is increased in accordance with an increase in the calculated lateral acceleration. The torque distribution amount determining means is adapted to increase the amount of torque distributed to a value which is larger than the value directly proportional to the lateral acceleration.

With the above arrangement, even if the cornering force generated by the front wheel in response to an increase in lateral acceleration of the vehicle is insufficient and as a result, the vehicle falls into an unintended under-steering tendency, the under-steering tendency can be compensated for by further increasing the amount of torque distributed to the left and right wheels.

According to a third aspect and feature of the present invention, there is provided a yaw moment control system in a vehicle, comprising left and right rear wheels as driven wheels, left and right front wheels as follower wheels, and a torque distributing means for distributing torque between the left and right front wheels and/or between the left and right rear wheels. A longitudinal acceleration calculating means calculates the longitudinal acceleration of the vehicle, and a torque distribution amount determining means controls the amount of torque distributed by the torque distributing means, such that it is increased in accordance with an increase in the calculated longitudinal acceleration. The torque distribution amount determining means is adapted to increase the amount of torque distributed to a value which is smaller than the value directly proportional to the longitudinal acceleration.

With the above arrangement, the cornering force of the rear wheel is decreased in accordance with an increase in longitudinal acceleration of the vehicle, i.e., in accordance with an increase in driving force for the rear wheel, and even if the vehicle falls into an unintended over-steering tendency, the over-steering tendency can be compensated for by lessening the increasing amount of torque distributed to the left and right wheels.

According to a fourth aspect and feature of the present invention, there is provided a yaw moment control system in a vehicle, comprising left and right rear wheels as driven wheels, left and right front wheels as follower wheels, and a torque distributing means for distributing torque between the left and right front wheels and/or between the left and right rear wheels. A lateral acceleration calculating means calculates the lateral acceleration of the vehicle, and a torque distribution amount determining means controls the amount of torque distributed by the torque distributing means, such that it is increased in accordance with an increase in the calculated lateral acceleration. The torque distribution amount determining means is adapted to increase the amount of torque distributed to a value which is smaller than the value directly proportional to the lateral acceleration.

With the above arrangement, even if the cornering force generated by the rear wheel in response to an increase in lateral acceleration of the vehicle is insufficient and as a result, the vehicle falls into an unintended over-steering tendency, the over-steering tendency can be compensated for by lessening the increasing amount of torque distributed to the left and right wheels.

The above and other objects, features and advantages of the invention will become apparent from the following description of the preferred embodiments taken in conjunction with the accompanying drawings.

BRIEF DESCRIPTION OF THE DRAWINGS

FIGS. 1 to 5B illustrate a first embodiment of the present invention, wherein

FIG. 1 is an illustration of the entire arrangement of a front engine/front drive vehicle equipped with a torque distribution control system according to the embodiment of the present invention.

FIG. 2 is a block diagram illustrating a circuit arrangement of an electronic control unit.

FIG. 3 is an illustration for explaining the yaw moment generated in the vehicle which is being turned.

FIG. 4 is an illustration for explaining the yaw moment generated with the engagement of a hydraulic clutch.

FIG. 5B is a graph illustrating the corrected lateral acceleration Yg'.

FIGS. 7 to 8B illustrate a third embodiment, wherein

FIG. 7 is an illustration of the entire arrangement of a mid-engine/rear drive vehicle equipped with a torque distribution control system according to the embodiment of the present invention.

FIG. 8B is a graph illustrating the corrected lateral acceleration Yg'.

DETAILED DESCRIPTION OF THE PREFERRED EMBODIMENTS

A first embodiment of the present invention will now be described with reference to FIGS. 1 to 5B.

Figure 1:
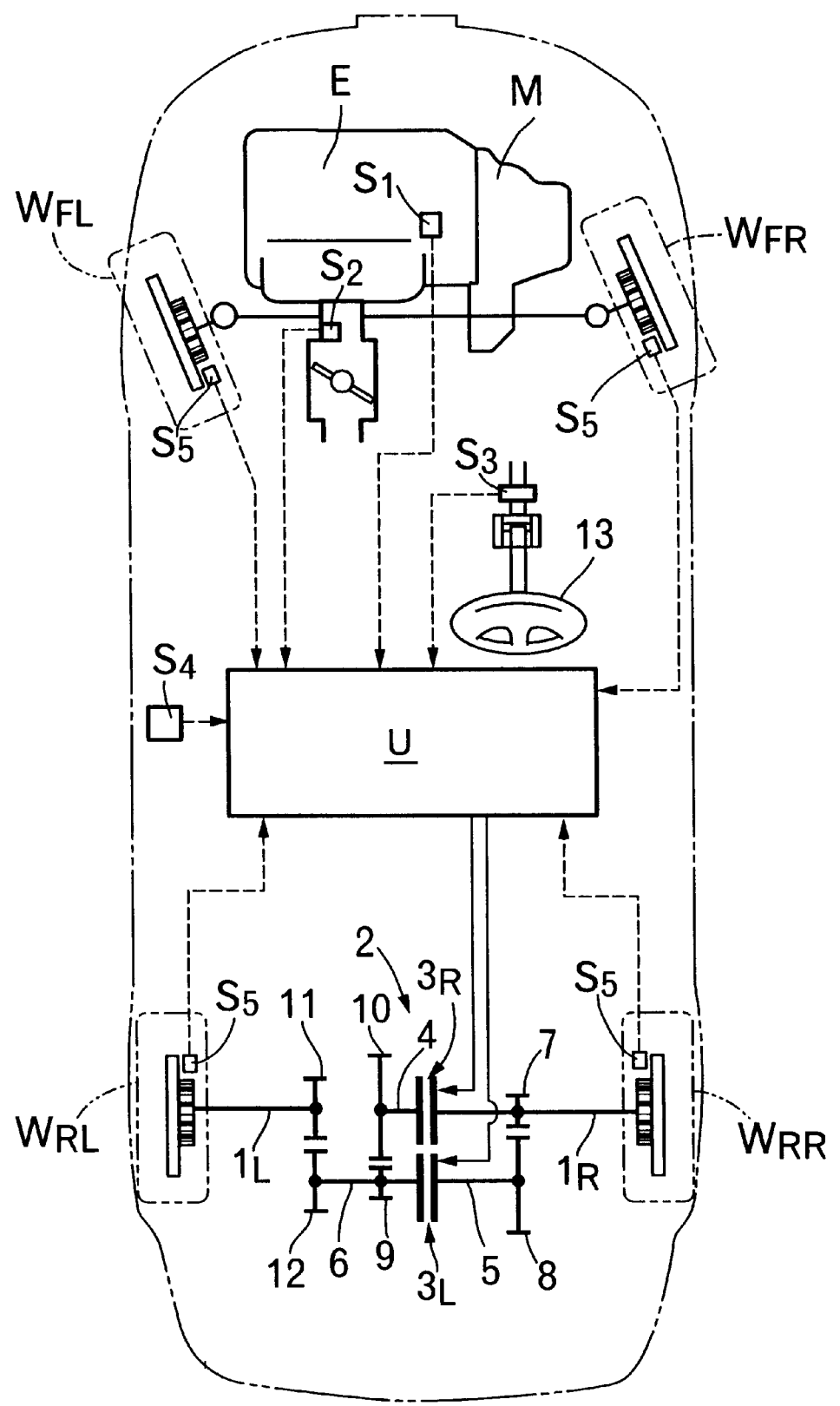

As shown in FIG. 1, a transmission M is connected to a right side of an engine E laterally mounted at a front portion of a vehicle body, and a left front wheel $W_{FL}$ and a right front wheel $W_{FR}$ which are driven wheels, are driven by the engine E and the transmission M.

A gear box 2 is mounted between axles $1_L$ and $1_R$ of left and right rear wheels $W_{RL}$ and $W_{RR}$ which are the follower wheels. The gear box 2 connects the left and right rear wheels $W_{RL}$ and $W_{RR}$, so that they are rotated at a different number of rotations. The gear box 2 forms the torque distributing means according to the embodiment of the present invention and is provided with a first hydraulic clutch $3_L$ and a second hydraulic clutch $3_R$. If the first hydraulic clutch $3_L$ is brought into its engaged state, the number of rotations of the left rear wheel $W_{RL}$ is decreased, while the number of rotations of the right rear wheel $W_{RR}$ is increased. If the second hydraulic clutch $3_R$ is brought into its engaged state, the number of rotations of the right rear wheel $W_{RR}$ is decreased, while the number of rotations of the left rear wheel $W_{RL}$ is increased.

The gear box 2 includes a first shaft 4 disposed coaxially with the left and right axles $1_L$ and $1_R$, and a second shaft 5 and a third shaft 6 which are disposed in parallel to the left and right axles $1_L$ and $1_R$ and coaxially with each other. The first hydraulic clutch $3_L$ is disposed between the second shaft 5 and the third shaft 6, and the second hydraulic clutch $3_R$ is disposed between the right axle $1_R$ and the first shaft 4. A first gear 7 having a smaller diameter and provided on the right axle $1_R$, is meshed with a second gear 8 having a larger diameter and provided on the second shaft 5, and a third gear 9 having a smaller diameter and provided on the third shaft 6, is meshed with a fourth gear 10 having a larger diameter and provided on the first shaft 4. A fifth gear 11 provided on the left axle $1_L$, is meshed with a sixth gear 12 provided on the third shaft 6.

The number of teeth of the first and third gears 7 and 9 are set, so that they are the same, and the number of teeth of the second and fourth gears 8 and 10 are set, so that they are the same and larger than the number of teeth of the first and third gears 7 and 9. The number of teeth of the fifth and sixth gears 11 and 12 are set, so that they are the same.

Therefore, if the first hydraulic clutch $3_L$ is brought into its engaged state, the right rear wheel $W_{RR}$ is connected to the left rear wheel $W_{RL}$ through the right axle $1_R$, the first gear 7, the second gear 8, the second shaft 5, the first hydraulic clutch $3_L$, the third shaft 6, the sixth gear 12, the fifth gear 11 and the left axle $1_L$. At this time, the number of rotations of the left rear wheel $W_{RL}$ is increased relative to the number of rotations of the right rear wheel $W_{RR}$ in accordance with the ratio of the number of teeth of the first gear 7 to the number of teeth of the second gear 8. Thus, if the first hydraulic clutch $3_L$ is brought into its engaged state in a condition in which the left and right rear wheels $W_{RL}$ and $W_{RR}$ are being rotated at the same speed, the number of rotations of the right rear wheel $W_{RR}$ is increased, and the number of rotations of the left rear wheel $W_{RL}$ is decreased.

If the second hydraulic clutch $3_R$ is brought into its engaged state, the right rear wheel $W_{RR}$ is connected to the left rear wheel $W_{RL}$ through the right axle $1_R$, the second hydraulic clutch $3_R$, the first shaft 4, the fourth gear 10, the third gear 9, the third shaft 6, the sixth gear 12, the fifth gear 11 and the left axle $1_L$. At this time, the number of rotations of the left rear wheel $W_{RL}$ is increased relative to the number of rotations of the right rear wheel $W_{RR}$ in accordance with the ratio of the number of teeth of the fourth gear 10 to the number of teeth of the third gear 9. Thus, if the second hydraulic clutch $3_R$ is brought into its engaged state in a condition in which the left and right rear wheels $W_{RL}$ and $W_{RR}$ are being rotated at the same speed, the number of rotations of the right rear wheel $W_{RR}$ is decreased, and the number of rotations of the left rear wheel $W_{RL}$ is increased.

Engagement forces of the first and second hydraulic clutches $3_L$ and $3_R$ can be continuously controlled by adjusting the magnitude of the hydraulic pressure applied to the first and second hydraulic clutches $3_L$ and $3_R$. Therefore, the ratio of the number of rotations of the left rear wheel $W_{RL}$ to the number of rotations of the right rear wheel $W_{RR}$ is also continuously controlled within a range determined depending upon the ratio of the number of teeth of the first to fourth gears 7, 8, 9 and 10.

Inputted to the electronic control unit U are signals from an engine revolution-number sensor $S_1$ for detecting a number of revolutions per minute of the engine E, an intake pipe or manifold internal absolute pressure sensor $S_2$ for detecting an internal absolute pressure in the intake pipe or manifold of the engine E, a steering angle sensor $S_3$ for detecting a steering angle of a steering wheel 13, a lateral acceleration sensor $S_4$ for detecting the lateral acceleration of the vehicle body, and wheel speed sensors $S_5$ for detecting the number of rotations per minute of the four wheels respectively to calculate the vehicle speed.

Figure 2:
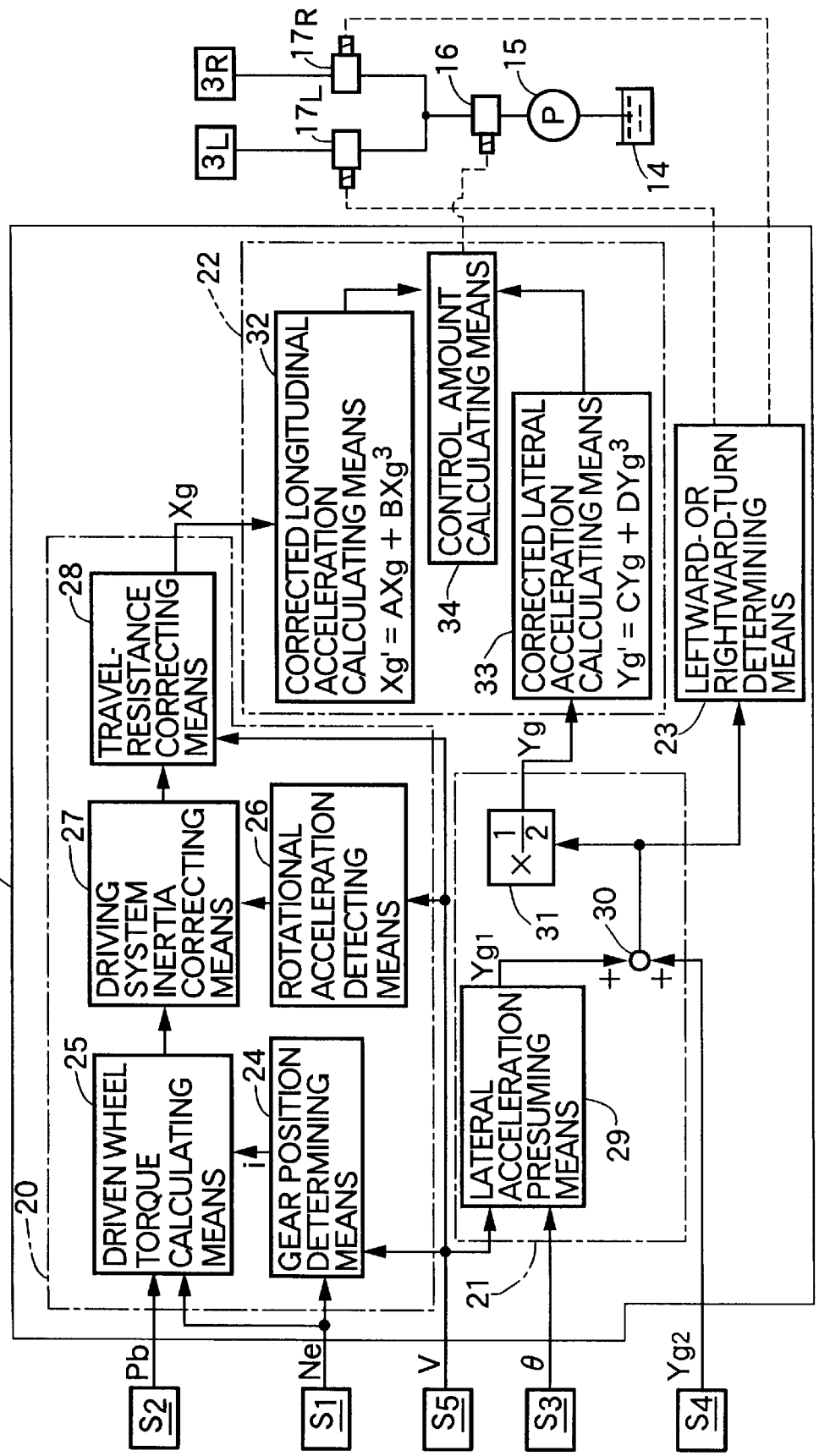

As can be seen from FIG. 2, the electronic control unit U is provided with a longitudinal acceleration calculating means 20, a lateral acceleration calculating means 21, a torque distribution amount determining means 22, and a leftward- or rightward-turn determining means 23. The longitudinal acceleration calculating means 20 is comprised of a gear position determining means 24, a driven wheel torque calculating means 25, a rotational acceleration calculating means 26, a driving system inertia correcting means 27, and a travel-resistance correcting means 28. The lateral acceleration calculating means 21 is comprised of a lateral acceleration presuming means 29, an adding means 30, and an average value calculating means 31. The torque distribution amount determining means 22 is comprised of a corrected longitudinal acceleration calculating means 32, a corrected lateral acceleration calculating means 33, and a control amount calculating means 34.

Oil pumped from an oil tank 14 by an oil pump 15, is regulated in pressure by a regulator valve 16 comprised of a linear solenoid valve, and supplied to the first hydraulic clutch $3_L$ through a first on/off valve $17_L$ and to the second hydraulic clutch $3_R$ through a second on/off valve $17_R$. The electronic control unit U controls the magnitude of the output hydraulic pressure from the regulator valve 16 and the opening and closing of the first and second on/off valves $17_L$ and $17_R$ in order to bring one of the first and second hydraulic clutches $3_L$ and $3_R$ of the gear box 2 into its engaged state to generate a braking force in one of the left and right rear wheels $W_{RL}$ and $W_{RR}$ and to generate a driving force in the other.

The calculation of a longitudinal acceleration Xg by the longitudinal acceleration calculating means 20 will be described below. The gear position determining means 24 determines a gear position of the transmission M based on a number Ne of revolutions per minute of the engine detected by the engine revolution-number sensor $S_1$ and a vehicle speed V detected by the wheel speed sensors $S_5$. The driven wheel torque calculating means 25 calculates an engine torque based on the number of revolutions per minute Ne of the engine and an internal absolute pressure Pb in the intake pipe or manifold detected by the intake pipe or manifold internal absolute pressure sensor $S_2$, and calculates a driven wheel torque by adding a correction provided by a gear ratio i in the detected gear position. The rotational acceleration detecting means 26 detects the rotational acceleration of the driving system based on the vehicle speed V, and the driving system inertia correcting means 27 corrects the driven wheel torque by the rotational acceleration of the driving system. Further, the travel-resistance correcting means 28 corrects the driven wheel torque as a function of the detected travel resistance, based on the vehicle speed V, thereby finally calculating a longitudinal acceleration Xg of the vehicle.

The calculation of a lateral acceleration Yg by the lateral acceleration calculating means 21 will be described. The lateral acceleration presuming means 29 searches a presumed lateral acceleration $Yg_1$ from a map based on the steering angle θ detected by the steering angle sensor $S_3$ and the vehicle speed V. In the adding means 30, the presumed lateral acceleration $Yg_1$ and the actual lateral acceleration $Yg_2$ detected by the lateral acceleration sensor $S_4$, are added to each other, and in the average value calculating means 31, a value resulting from such addition is multiplied by ½ to calculate a lateral acceleration Yg which is an average value between the presumed lateral acceleration $Yg_1$ and the actual lateral acceleration $Yg_2$. By correcting the actual lateral acceleration $Yg_2$ by the presumed lateral acceleration $Yg_1$ in the above manner, an accurate lateral acceleration Yg free from a time lag can be obtained.

Then, the corrected longitudinal acceleration calculating means 32 of the torque distribution amount determining means 22 calculates a corrected longitudinal acceleration Xg' as a function of the longitudinal acceleration Xg according to the following equation:

$$Xg' = A \times Xg + B \times Xg^3 \qquad (1)$$

The right side in the equation (1) is the sum of the primary and tertiary terms of Xg, and each of A and B is a preset positive constant. If the right side in the equation (1) is only the primary term (A×Xg), the corrected longitudinal acceleration Xg' is increased in direct proportion to an increase in the longitudinal acceleration Xg, but due to the presence of the tertiary term (B×Xg³) on the right side in the equation (1), the corrected longitudinal acceleration Xg' is further increased to a value which is larger than the value which is directly proportional to the longitudinal acceleration Xg.

Likewise, the corrected lateral acceleration calculating means 33 of the torque distribution amount determining means 22 calculates a corrected lateral acceleration Yg' as a function of the lateral acceleration Yg according to the following equation:

$$Yg' = C \times Yg + D \times Yg^3 \qquad (2)$$

The right side in the equation (2) is the sum of the primary and tertiary terms of Yg, and each of C and D is a preset positive constant. If the right side in the equation (2) is only the primary term (C×Yg), the corrected lateral acceleration Yg' is increased in direct proportion to an increase in the lateral acceleration Yg, but due to the presence of the tertiary term (D×Yg³) on the right side in the equation (2), the corrected lateral acceleration Yg' is further increased to a value which is larger than the value which is directly proportional to the lateral acceleration Yg.

The control amount calculating means 34 calculates a control amount for the regulator valve 16, namely, a torque amount distributed between the left and right rear wheels $W_{RL}$ and $W_{RR}$ as a function of a value Xg'×Yg' resulting from the multiplication of the corrected longitudinal acceleration Xg' and the corrected lateral acceleration Yg'.

The operation of the embodiment of the present invention having the above-described arrangement will be described below.

Figure 3:
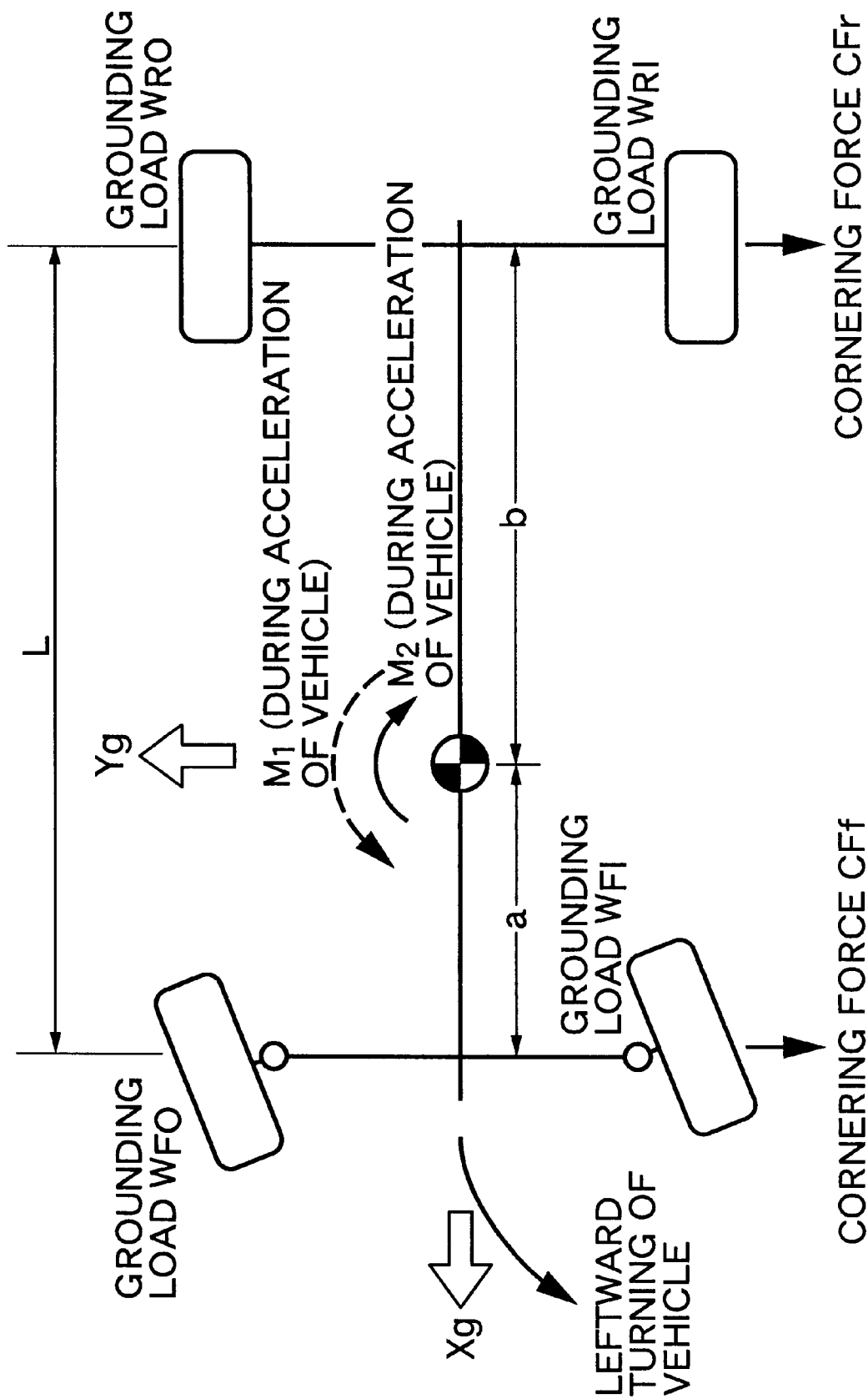

FIG. 3 shows a vehicle having a weight W which is being turned leftwards at a lateral acceleration Yg. In this case, a centrifugal force W×Yg is applied to the position of the center of gravity of the vehicle and balanced with the sum of a cornering force CFf applied between the front wheels and the road surface and a cornering force CFr applied between the rear wheels and the road surface.

$$W \times Yg = CFf + CFr \qquad (3)$$

If the distance between the position of the center of gravity of the vehicle and the front wheels is represented by a, and the distance between the position of the center of gravity of the vehicle and the rear wheels is represented by b, a moment $M_1$ provided about a yaw axis by the cornering forces CFf and CFr is given according to $$M_1 = a \times CFf - b \times CFr \qquad (4)$$

When the vehicle is traveling straight, the grounding loads of the left and right wheels are equal to each other, but when the vehicle is being turned, the grounding loads of the inner and outer wheels during turning of the vehicle are different from each other. Thus, during turning of the vehicle, a centrifugal force directed outwards in a turning direction is applied to the center of gravity of the vehicle body and for this reason, the vehicle body tends to fall down outwards in the turning direction. As a result, there is a tendency during turning for the inner wheel to rise from the road surface, whereby the grounding load of the inner wheel is decreased, and there is a tendency during turning for the outer wheel to be urged against the road surface, whereby the grounding load of the outer wheel is increased.

When the vehicle is traveling at a constant speed, the grounding loads of the front and rear wheels are constant, but when the vehicle is accelerating or decelerating, the grounding loads of the front and rear wheels are varied. Specifically, during acceleration of the vehicle, an inertial force directed rearwards of the vehicle body is applied to the center of gravity of the vehicle body and hence, the vehicle body tends to tail-dive, whereby the grounding load of the rear wheel is increased. As a result, the cornering force of the rear wheel is increased to apply the moment $M_1$ in a direction opposite from the turning direction. During deceleration of the vehicle, an inertial force directed forwards of the vehicle body is applied to the center of gravity of the vehicle body and hence, the vehicle body tends to nose-dive, whereby the grounding load of the front wheel is increased. As a result, the cornering force of the front wheel is increased to apply the moment $M_1$ in the same direction as the turning direction (see an arrow shown by a solid line and an arrow shown by a dashed line in FIG. 3).

When the vehicle is traveling straight at a constant speed, the grounding load of each of the front wheels is Wf/2, wherein Wf represents the sum of the grounding loads of the left and right front wheels. However, when the vehicle is accelerating or decelerating at the longitudinal acceleration Xg, while being turned at the lateral acceleration Yg, the grounding load $W_{F1}$ of the front inner wheel during turning of the vehicle and the grounding load $W_{F0}$ of the front outer wheel during turning of the vehicle are given according to the following equations:

$$W_{F1} = Wf/2 - Kf \times Yg - Kh \times Xg \qquad (5)$$

$$W_{F0} = Wf/2 + Kf \times Yg - Kh \times Xg \qquad (6)$$

In addition, if the sum of the grounding loads of the left and right rear wheels is represented by Wr, the grounding load $W_{R1}$ of the rear inner wheel during turning of the vehicle and the grounding load $W_{R0}$ of the rear outer wheel during turning of the vehicle are given according to the following equations:

$$W_{R1} = Wr/2 - Kr \times Yg + Kh \times Xg \qquad (7)$$

$$W_{R0} = Wr/2 + Kr \times Yg + Kh \times Xg \qquad (8)$$

In the equations (5) to (8), factors Kf, Kr and Kh are given according to the following equations:

$$Kf = (Gf' \times hg' \times W + hf \times Wf)/tf \qquad (9)$$

$$Kr = (Gr' \times hg' \times W + hr \times Wr)/tr \qquad (10)$$

$$Kh = hg \times W/(2 \times L) \qquad (11)$$

Characters used in the above equations are as follows:
- Gf, Gr: Roll rigidity of the front and rear wheels
- Gf', Gr': Distribution of roll rigidity of the front and rear wheels
- Gf'=Gf/(Gf+Gr)
- Gr'=Gr/(Gf+Gr)
- hf, hr: Height of roll center of the front and rear wheels
- hg: Height of center of gravity
- hg': Distance between the center of gravity and the roll axis, hg'=hg−(hf×Wf+hr×Wr)/W
- tf, tr: Tread of the front and rear wheels
- L: Wheel base, L=a+b Provided that the cornering force of a tire is proportional to the grounding load of the tire, the cornering force CFf of the front wheel is given according to the following equation from that grounding load $W_{F1}$ of the front inner wheel during turning of the vehicle, which is given in the equation (5) and that grounding load $W_{F0}$ of the front outer wheel during turning of the vehicle, which is given in the equation (6) and the lateral acceleration Yg:

$$\begin{aligned} CFf &= W_{F1} \times Yg + W_{F0} \times Yg \\ &= Wf \times Yg - 2 \times kh \times Xg \times Yg \end{aligned} \qquad (12)$$

In addition, the cornering force CFr of the rear wheel is given according to the following equation from that grounding load $W_{R1}$ of the rear inner wheel during turning of the vehicle, which is given in the equation (7) and that grounding load $W_{R0}$ of the rear outer wheel during turning of the vehicle, which is given in the equation (8) and the lateral acceleration Yg:

$$CFr = W_{RI} \times Yg + W_{RO} \times Yg \quad (13)$$

$$= Wr \times Yg + 2 \times kh \times Xg \times Yg$$

If the equations (12) and (13) are replaced into the equation (4), the following equation is provided:

$$M_1 = a \times (Wf \times Yg - 2 \times Kh \times Xg \times Yg) - \quad (14)$$

$$b \times (Wr \times Yg + 2 \times Kh \times Xg \times Yg)$$

$$= (a \times Wf - b \times Wr) \times Yg - 2 \times Kh \times L \times Xg \times Yg$$

wherein a×Wf−b×Wr=0, and Kh=hg×W/(2×L) from the equation (11), and hence, the equation (14) is as follows:

$$M_1 = -hg \times W \times Xg \times Yg \quad (15)$$

It can be seen that the moment $M_1$ about the yaw axis is proportional to the product of the longitudinal acceleration Xg and the lateral acceleration Yg. Therefore, if the driving force and the braking force are distributed between the inner and outer wheels during turning of the vehicle to eliminate the moment $M_1$ about the yaw axis given in the equation (15), the turning stability and the high-speed stability during acceleration or deceleration of the vehicle can be enhanced, when the vehicle is being turned.

Figure 4:
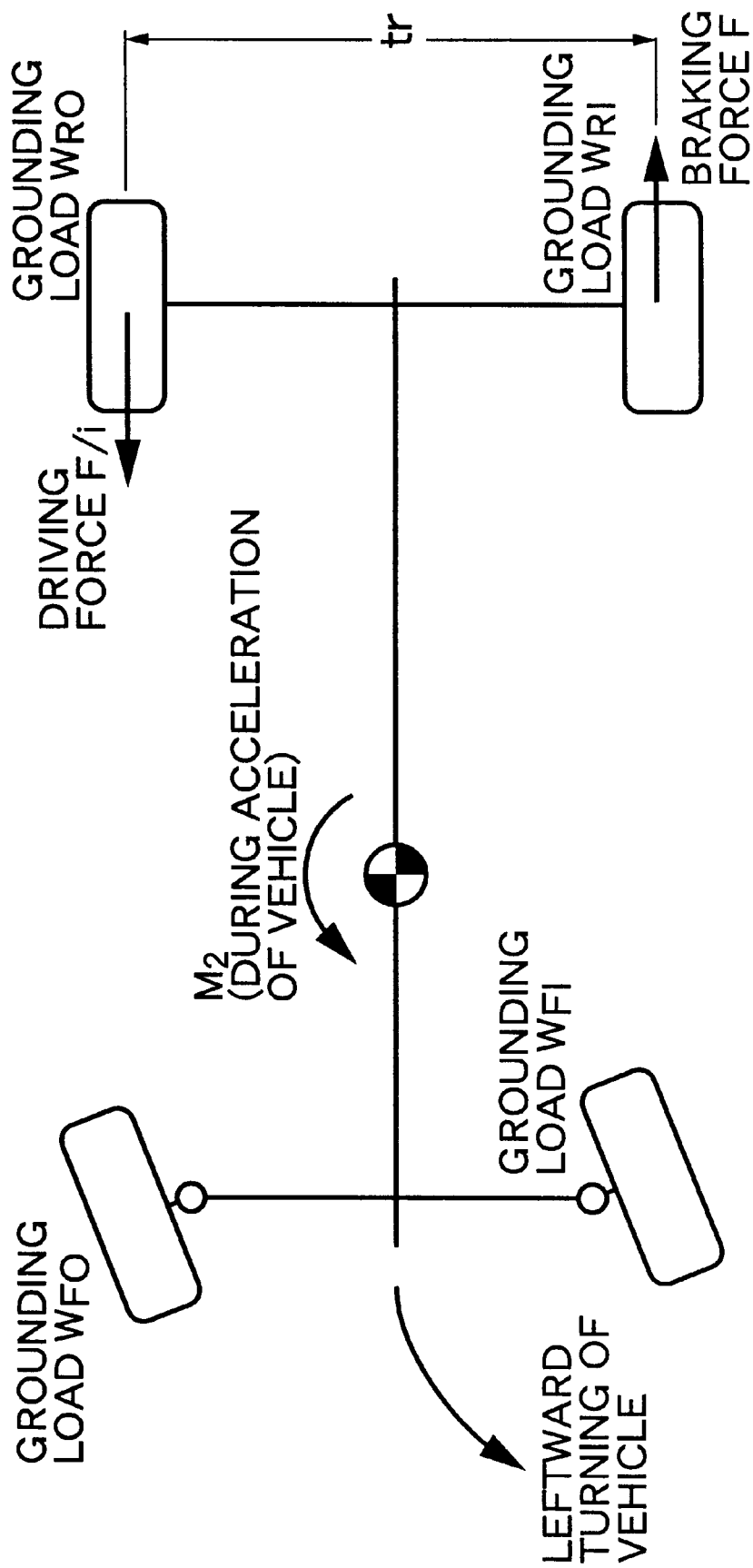

On the other hand, for example, when a braking force F is generated in the inner wheel during turning of the vehicle, as shown in FIG. 4, a driving force F/i is generated in the outer wheel during turning of the vehicle, wherein i represents a gear ratio of the gear box 2. A moment $M_2$ about the yaw axis generated in the vehicle by the braking force F and the driving force F/i, is given according to the following equation:

$$M_2 = (tr/2) \times F \times \kappa \quad (16)$$

$$= (tr/2) \times (T/R) \times \kappa$$

wherein κ=1+(1/i); T is a clutch torque; and R is a radius of a tire.

Therefore, a clutch torque T required to eliminate the moment $M_1$ by the moment $M_2$ is given by establishing $M_1 = M_2$ according to the following equation:

$$T = \{2R/(tr \times \kappa)\} \times hg \times W \times Xg \times Yg \quad (17)$$

As apparent from the equation (17), the clutch torque T is a value which is proportional to the product of the longitudinal acceleration Xg and the lateral acceleration Yg. Since it has been assumed in the foregoing description that the cornering force of the tire is proportional to the grounding load of the tire, the clutch torque T is proportional to the product Xg×Yg of the longitudinal acceleration Xg and the lateral acceleration Yg, but to be exact, the cornering force is not proportional to the grounding load. For this reason, it is preferable that the clutch torque T is handled as a function of the product Xg×Yg of the longitudinal acceleration Xg and the lateral acceleration Yg.

As shown in Table 1, if the first hydraulic clutch $3_L$, when the vehicle is accelerating during leftward turning, is brought into the engaged state with the clutch torque T given in the equation (17), by opening the first on/off valve $17_L$ based on the determination provided by the leftward- and rightward-turn determining means 23, and the hydraulic pressure output to the regulator valve 16 is controlled by the control amount calculating means 34, the number of rotations of the inner wheel during turning of the vehicle is decreased to generate the braking force F, while the number of rotations of the outer wheel during turning of the vehicle is increased to generate the driving force F/i. Thus, the moment $M_1$ in the direction opposite from the turning direction based on the cornering force, is eliminated to thereby enhance the turning performance. Likewise, if the second hydraulic clutch $3_R$ is brought into the engaged state with the clutch torque T, when the vehicle is accelerated during rightward turning thereof, the moment $M_1$ based on the cornering force is likewise eliminated to enhance the turning performance.

If the second hydraulic clutch $3_R$ is brought into the engaged state with the clutch torque T given in the equation (17), when the vehicle is decelerating during leftward turning thereof, the number of rotations of the inner wheel during turning of the vehicle is increased to generate the driving force F, and the number of rotations of the outer wheel during turning of the vehicle is decreased to generate the braking force F/i. Thus, the moment $M_1$ in the same direction as the turning direction based on the cornering force is eliminated to enhance the high-speed stability. Likewise, if the first hydraulic clutch $3_L$ is brought into the engaged state with the clutch torque T, when the vehicle is decelerating during rightward turning thereof, the moment $M_1$ based on the cornering force is likewise eliminated to enhance the high-speed stability.

TABLE 1

| | Leftward turning | Rightward turning | Effect |
| --- | --- | --- | --- |
| During acceleration | Turning-ON of first clutch $3_L$ | Turning-ON of second clutch $3_R$ | Enhancement of turning performance |
| During deceleration | Turning-ON of second clutch $3_R$ | Turning-ON of first clutch $3_L$ | Enhancement of high-speed stability |

Even if the vehicle is accelerating or decelerating during straight traveling thereof, the yaw moment of the vehicle is not varied and hence, the first and second hydraulic clutches $3_L$ and $3_R$ are maintained at their non-engaged state.

If a driver has further depressed an accelerator pedal to accelerate the vehicle when the front wheels $W_{FL}$ and $W_{FR}$ which are the driven wheels are being turned near a limit of the grip force of the tires, then the cornering forces CFf generated by the front wheels $W_{FL}$ and $W_{FR}$ may be smaller than the actually required cornering force for the above-described reason, and the front portion of the vehicle may be pushed outwards in the turning direction in some cases, thereby intensifying the under-steering tendency. At this time, the clutch torque T given in the equation (17), is provided without consideration of the yaw moment due to the lack of the cornering forces CFf of the front wheels $W_{FL}$ and $W_{FR}$ and for this reason, it is impossible to compensate for the generation of the above-described under-steering tendency.

Therefore, if the corrected longitudinal acceleration Xg' and the corrected lateral acceleration Yg' given in equations (1) and (2) in consideration of the yaw moment due to the lack of the cornering forces CFf of the front wheels $W_{FL}$ and $W_{FR}$, are used in place of the longitudinal acceleration Xg and the lateral acceleration Yg in the equation (17), namely, if the clutch torque T is calculated according to the following equation:

$$T=\{2R/(tr\times\kappa)\}\times hg\times W\times Xg'\times Yg' \qquad (18)$$

the under-steering tendency during turning of the vehicle can be compensated for.

Figure 5B:
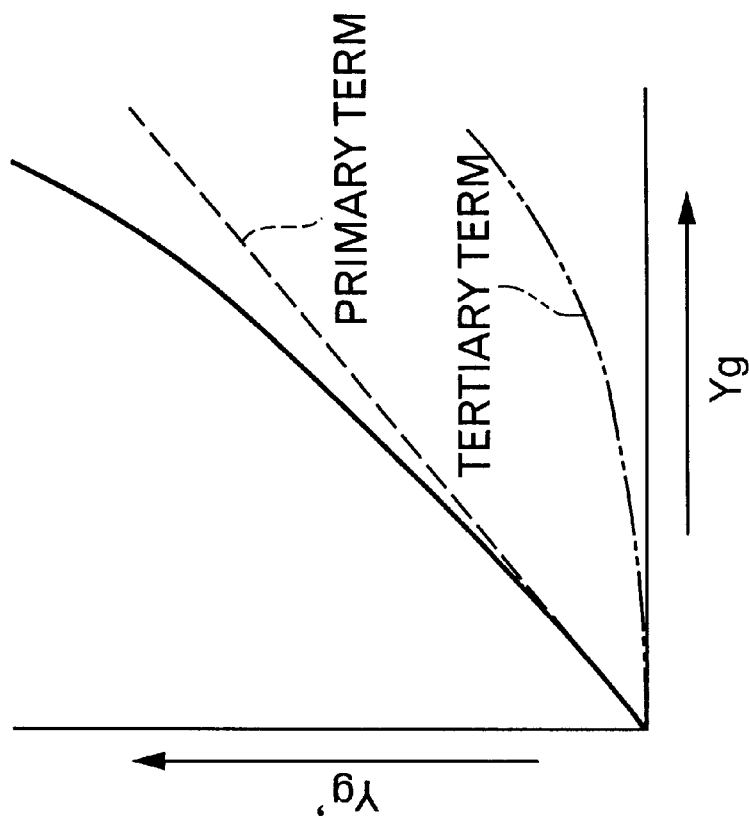
Figure 5A:
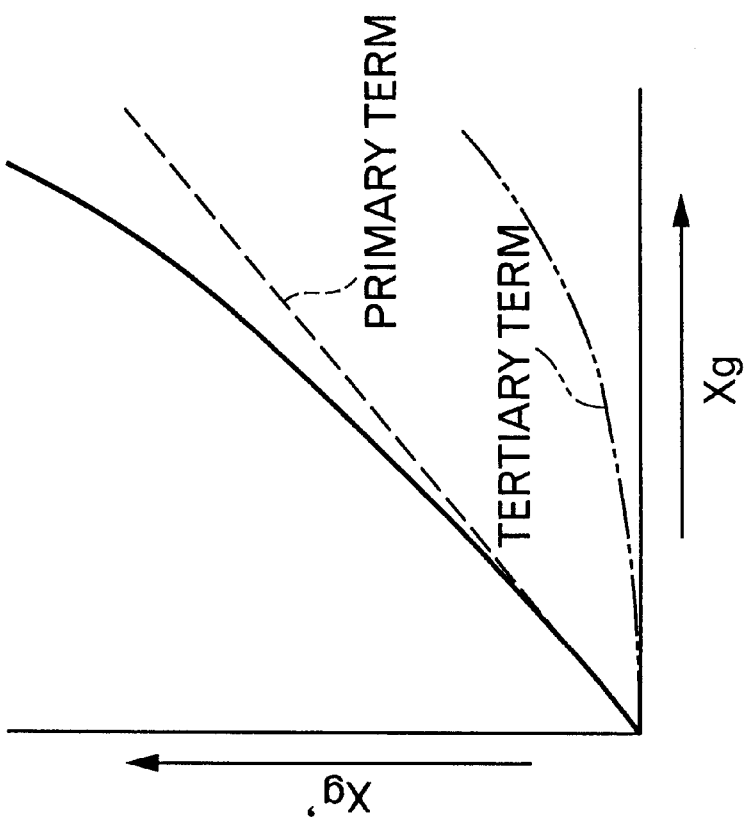
FIG. 5A is a graph illustrating the corrected longitudinal acceleration Xg'.

This will be further described. In FIGS. 5A and 5B, dotted lines correspond to the first term (the primary term of the longitudinal acceleration Xg and the lateral acceleration Yg) on the right side in the equations (1) and (2); dashed lines correspond to the second term (the tertiary term of the longitudinal acceleration Xg or the lateral acceleration Yg) on the right side in the equations (1) and (2), and the values indicated by solid lines resulting from the addition of the dotted lines and the dashed lines, correspond to the corrected longitudinal acceleration Xg' and the corrected lateral acceleration Yg'. The equation (17) corresponding to that in the prior art, is an equation resulting from the elimination of the tertiary term of the second term on the right sides in the equations (1) and (2), and if the tertiary term is added to this equation, the equation (18) in this embodiment can be obtained. According to this embodiment, the clutch torque T is increased by an amount corresponding to the tertiary term in accordance with an increase in the longitudinal acceleration Xg or the lateral acceleration Yg, and in accordance with this increase, the amount of torque distributed between the left and right front wheels $W_{FL}$ and $W_{FR}$ is increased. Therefore, the yaw moment generated due to the lack of the cornering forces CFf of the front wheels $W_{FL}$ and $W_{FR}$ can be eliminated to prevent the generation of the under-steering tendency.

Figure 6A:
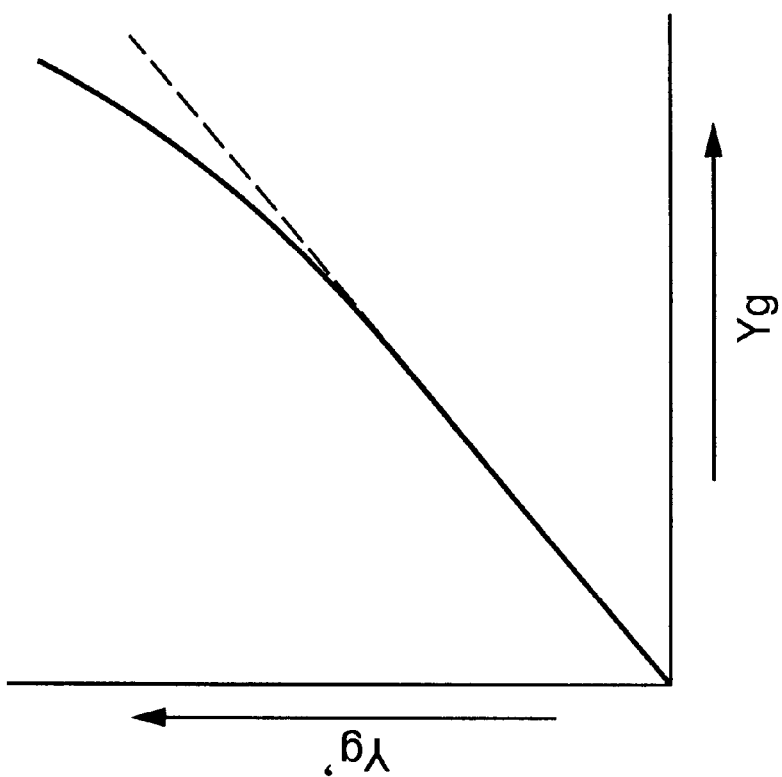
FIGS. 6A and 6B are graphs similar to FIGS. 5A and 5B, but according to a second embodiment of the present invention.
Figure 6B:
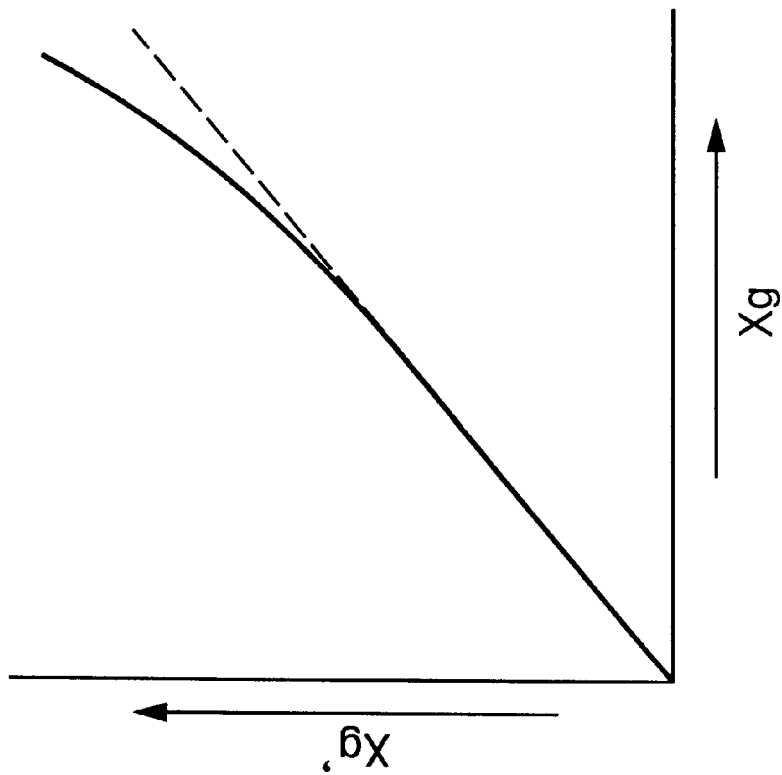

FIGS. 6A and 6B illustrate a second embodiment. In the first embodiment, the corrected longitudinal acceleration Xg' and the corrected lateral acceleration Yg' have been determined as functions of the longitudinal acceleration Xg and the lateral acceleration Yg according to the equations (1) and (2). In the second embodiment, however, the corrected longitudinal acceleration Xg' and the corrected lateral acceleration Yg' are determined from a table with the longitudinal acceleration Xg and the lateral acceleration Yg used as parameters. Even in the second embodiment, the amount of torque distributed is increased to a larger value than the value directly proportional to the longitudinal acceleration Xg or the lateral acceleration Yg. Therefore, the under-steering tendency during turning of the vehicle can be compensated for to enable a stable turning of the vehicle.

A third embodiment of the present invention will now be described with reference to FIGS. 7 to 8B.

Figure 7:
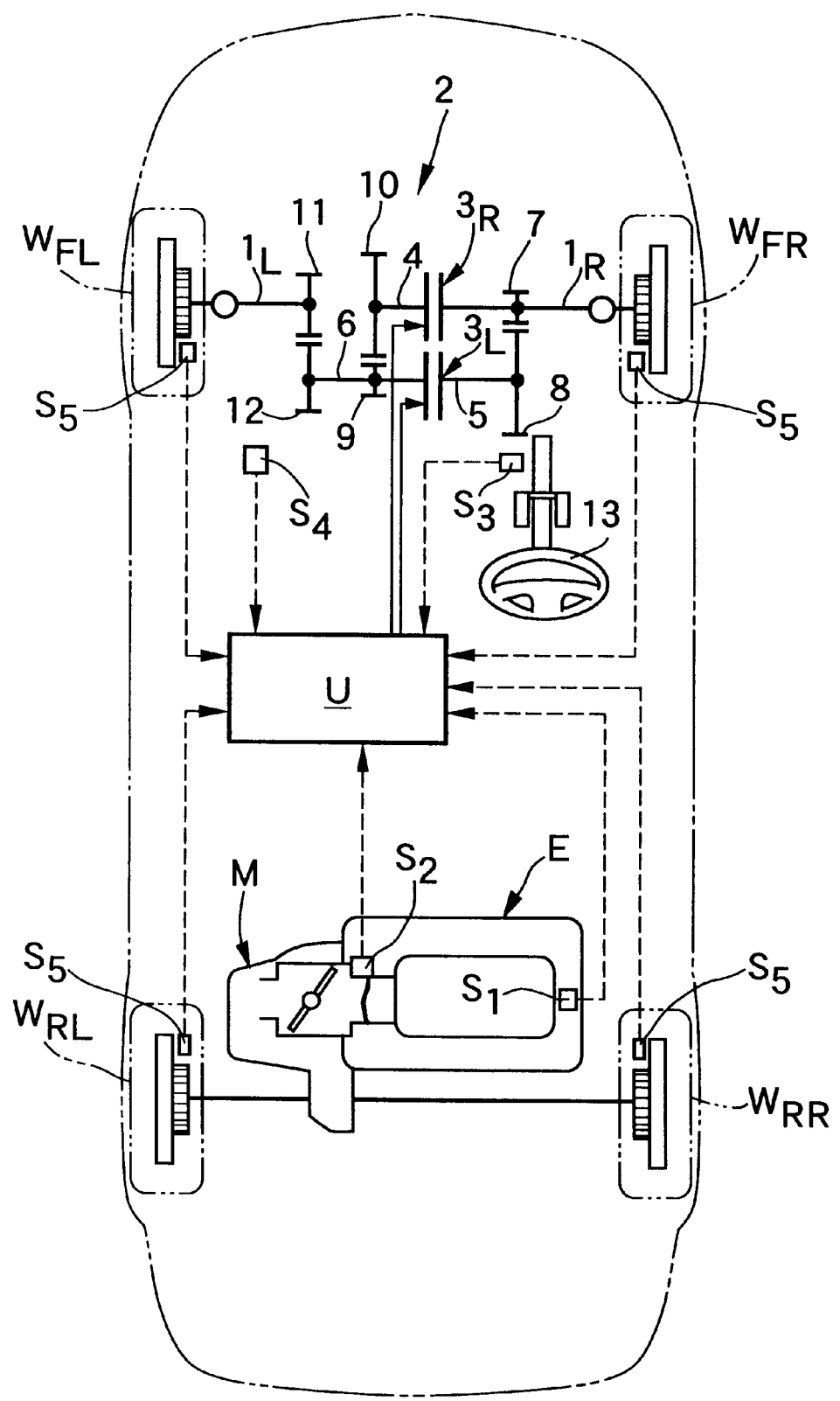

As can be seen from the comparison of FIG. 1 with FIG. 7, the first embodiment (see FIG. 1) applies to a front engine/front drive vehicle, but the third embodiment (see FIG. 7) applies to a mid-engine/rear drive vehicle including a left front wheel $W_{FL}$ and a right front wheel $W_{FR}$ which are follower wheels, and a left rear wheel $W_{RL}$ and a right rear wheel $W_{RR}$ which are driven wheels. A gear box 2 is mounted between axles $1_L$ and $1_R$ of the left and right front wheels $W_{FL}$ and $W_{FR}$, and connects the left and right front wheels $W_{FL}$ and $W_{FR}$, so that they are rotated at different number of rotations. The construction of the gear box 2 is the same as that in the first embodiment. The circuit arrangement of an electronic control unit U in the third embodiment is also the same as that in the first embodiment, except for the functions of a corrected longitudinal acceleration calculating means 32 and a corrected lateral acceleration calculating means 33 which will be described hereinafter (see FIG. 2)

In the third embodiment, the calculation of the longitudinal acceleration Xg by the longitudinal acceleration calculating means 20 and the calculation of the lateral acceleration Yg by the lateral acceleration calculating means 21 are carried out in a manner similar to that in the first embodiment. However, the calculation of the corrected longitudinal acceleration Xg' by the corrected longitudinal acceleration calculating means 32 of the torque distribution amount determining means 22 and the calculation of the corrected lateral acceleration Yg' by the corrected lateral acceleration calculating means 33 of the torque distribution amount determining means 22 are different from those in the first embodiment. More specifically, in the third embodiment, the corrected longitudinal acceleration Xg' is given according to the following equation:

$$Xg'=A\times Xg-B\times Xg^3 \qquad (1')$$

and the corrected lateral acceleration Yg' is given according to the following equation:

$$Yg'=C\times Yg-D\times Yg^3 \qquad (2')$$

As can be seen from the comparison of the equations (1') and (2') with the equations (1) and (2) in the first embodiment, both of the equations (1'), (2') and the equations (1), (2) are different from each other in respect of the fact that signs of the tertiary terms on the right sides are negative in the third embodiment.

Therefore, if the right side in the equation (1') is only the primary term (A×Xg), the corrected longitudinal acceleration Xg' is increased in direct proportion to an increase in the longitudinal acceleration Xg, but due to the presence of the tertiary term (−B×Xg³) on the right side in the equation (1'), the corrected longitudinal acceleration Xg' is increased to a value less than the value directly proportional to the longitudinal acceleration Xg. In addition, if the right side of the equation (2') is only the primary term (C×Yg), the corrected lateral acceleration Yg' is increased in direct proportion to an increase in the lateral acceleration Yg, but due to the presence of the tertiary term (−D×Yg³) on the right side in the equation (2'), the corrected lateral acceleration Yg' is increased to a value less than the value directly proportional to the lateral acceleration Yg.

The control amount calculating means 34 calculates a control amount for the regulator valve 16, namely, a torque amount distributed between the left and right rear wheels $W_{RL}$ and $W_{RR}$ as a function of a value Xg'×Yg' resulting from the multiplication of the corrected longitudinal acceleration Xg' and the corrected lateral acceleration Yg'.

In the vehicle in the third embodiment, the rear wheels $W_{RL}$ and $W_{RR}$ are driven wheels, but the clutch torque T required to eliminate a moment $M_1$ (a moment based on the cornering force) with a moment $M_2$ (a yaw moment produced by the distribution of the driving force and the braking force to between the left and right wheels) is given according to the equation (17), as in the vehicle in the first embodiment in which the front wheels $W_{FL}$ and $W_{FR}$ are driven wheels.

However, if a driver has further depressed the accelerator pedal to accelerate the vehicle when the rear wheels $W_{RL}$ and $W_{RR}$ which are the driven wheels are being turned near the limit of the grip force of the tires, then the cornering forces CFf generated by the rear wheels $W_{RL}$ and $W_{RR}$ may be smaller than the actually required cornering force for the above-described reason, and the rear portion of the vehicle may be pushed outwards in the turning direction in some cases, thereby intensifying the over-steering tendency. At this time, the clutch torque T given in the equation (17), is provided without consideration of the yaw moment due to the lack of the cornering forces CFf of the rear wheels $W_{RL}$ and $W_{RR}$ and for this reason, it is impossible to compensate for the generation of the above-described over-steering tendency.

Therefore, if the corrected longitudinal acceleration Xg' and the corrected lateral acceleration Yg' given in the equations (1') and (2') in consideration of the yaw moment due to the lack of the cornering forces CFr of the rear wheels $W_{RL}$ and $W_{RR}$, are used in place of the longitudinal acceleration Xg and the lateral acceleration Yg in the equation (17), the over-steering tendency during turning of the vehicle can be compensated for.

Figure 8A:
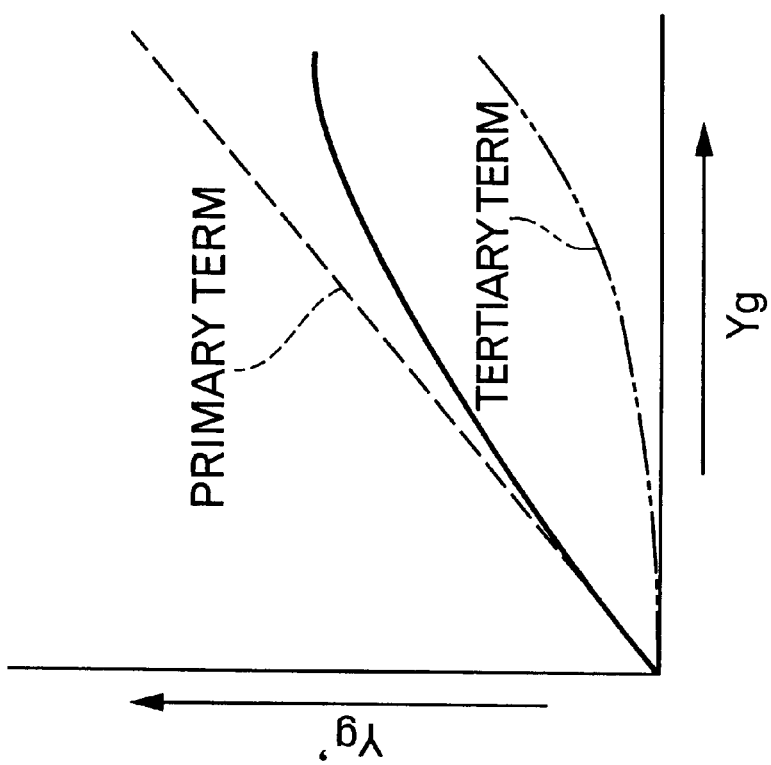
FIG. 8A is a graph illustrating the corrected longitudinal acceleration Xg'.
Figure 8B:
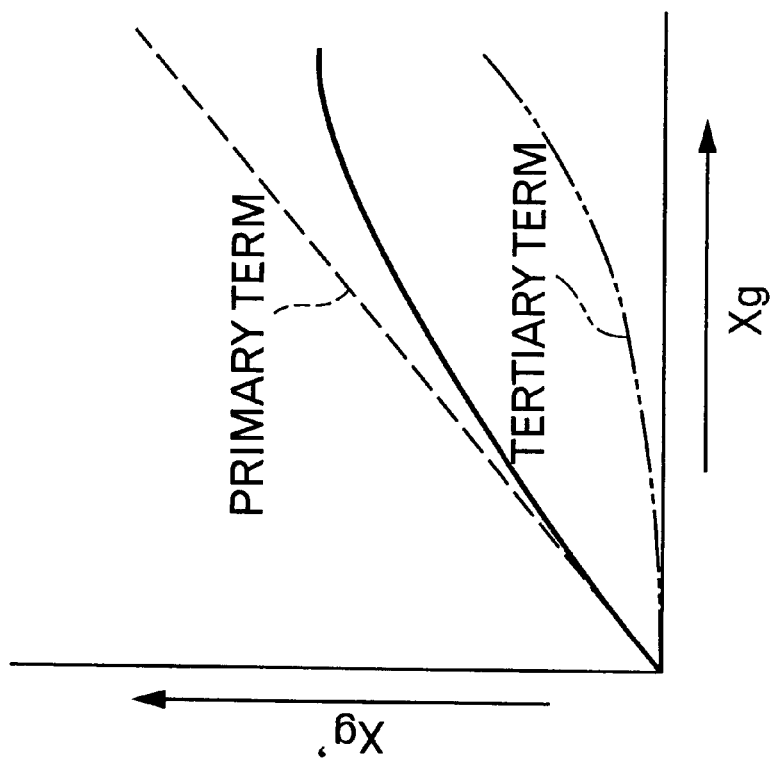

This will be further described. In FIGS. 8A and 8B, dotted lines correspond to the first term (the primary term of the longitudinal acceleration Xg and the lateral acceleration Yg) on the right side in the equations (1') and (2'); dashed lines correspond to the second term (the tertiary term of the longitudinal acceleration Xg or the lateral acceleration Yg) on the right side in the equations (1') and (2'), and values indicated by solid lines resulting from the reduction of the dotted lines from the dashed lines, correspond to the corrected longitudinal acceleration Xg' and the corrected lateral acceleration Yg'. According to this embodiment, the increase in clutch torque T is inhibited by an amount corresponding to the tertiary term in accordance with an increase in the longitudinal acceleration Xg or lateral acceleration Yg, and in accordance with this, the amount of torque distributed between the left and right rear wheels $W_{RL}$ and $W_{RR}$ is increased by a lesser amount. Therefore, the yaw moment generated due to the lack of the cornering forces CFr of the rear wheels $W_{RL}$ and $W_{RR}$ can be eliminated to prevent the generation of the over-steering tendency.

Figure 9B:
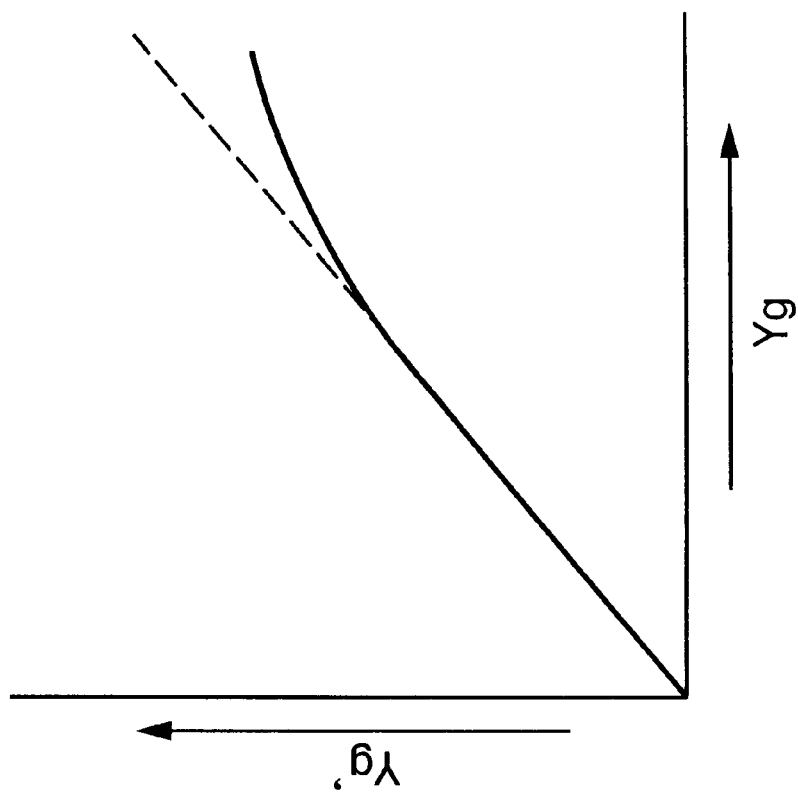
FIGS. 9A and 9B are graphs similar to FIGS. 8A and 8B, but according to a fourth embodiment of the present invention.
Figure 9A:
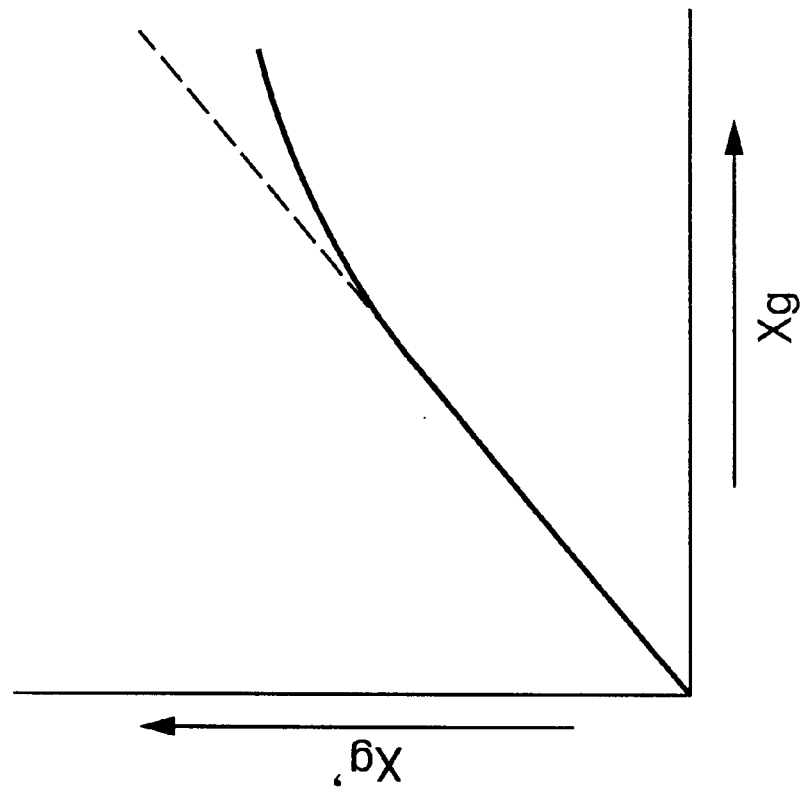

FIGS. 9A and 9B illustrate a fourth embodiment. In the third embodiment, the corrected longitudinal acceleration Xg' and the corrected lateral acceleration Yg' have been determined as functions of the longitudinal acceleration Xg and the lateral acceleration Yg according to the equations (1') and (2'). In the fourth embodiment, however, the corrected longitudinal acceleration Xg' and the corrected lateral acceleration Yg' are determined from a table with the longitudinal acceleration Xg and the lateral acceleration Yg used as parameters. Even in the fourth embodiment, the amount of torque distributed is increased to a lesser extent than the value directly proportional to the longitudinal acceleration Xg or the lateral acceleration Yg. Therefore, the over-steering tendency during turning of the vehicle can be compensated for to enable a stable turning of the vehicle.

Although the distribution of the torque between the left and right rear wheels $W_{RL}$ and $W_{RR}$ which are the follower wheels has been described in the first and second embodiments, the present invention is also applicable to the distribution of the torque between the left and right front wheels $W_{FL}$ and $W_{FR}$ which are the driven wheels. Although the distribution of the torque between the left and right front wheels $W_{FL}$ and $W_{FR}$ which are the follower wheels has been described in the third and fourth embodiments, the present invention is also applicable to the distribution of the torque between the left and right rear wheels $W_{RL}$ and $W_{RR}$ which are the driven wheels. In addition, in place of the first and second hydraulic clutches $3_L$ and $3_R$, other types of clutches, such as an electromagnetic clutch and a fluid coupling may be used. Further, the clutch torque T has been determined as the function of the product Xg'×Yg' of the corrected longitudinal acceleration Xg' and the corrected lateral acceleration Yg' in the above described embodiments, but even if the clutch torque T is determined as a function of only the corrected longitudinal acceleration Xg' or as a function of only the lateral acceleration Yg', a satisfactory function and effect can be obtained.

Although the embodiments of the present invention have been described in detail, it will be understood that the present invention is not limited to the above-described embodiments, and various modifications in design may be made without departing from the spirit and scope of the invention defined in claims.

I claim:

1. A yaw moment control system in a vehicle, comprising left and right front wheels as driven wheels, left and right rear wheels as follower wheels, a torque distributing means for distributing torque between said left and right front wheels, a longitudinal acceleration calculating means for calculating the longitudinal acceleration of the vehicle, and a torque distribution amount determining means for controlling the amount of torque distributed by said torque distributing means, such that the torque is increased as a function of an increase in the calculated longitudinal acceleration, said torque distribution amount determining means further increasing the amount of torque distributed to a value larger than the value directly proportional to the longitudinal acceleration.

2. A yaw moment control system in a vehicle, comprising left and right front wheels as driven wheels, left and right rear wheels as follower wheels, a torque distributing means for distributing torque between said left and right front wheels, a lateral acceleration calculating means for calculating the lateral acceleration of the vehicle, and a torque distribution amount determining means for controlling the amount of torque distributed by said torque distributing means, such that the torque is increased as a function of an increase in the calculated lateral acceleration, said torque distribution amount determining means further increasing the amount of torque distributed to a value larger than the value directly proportional to the lateral acceleration.

3. A yaw moment control system in a vehicle, comprising left and right rear wheels as driven wheels, left and right front wheels as follower wheels, a torque distributing means for distributing torque between said left and right front wheels, a longitudinal acceleration calculating means for calculating the longitudinal acceleration of the vehicle, and a torque distribution amount determining means for controlling the amount of torque distributed by said torque distributing means, such that the torque is increased as a function of an increase in the calculated longitudinal acceleration, said torque distribution amount determining means lessening the increase in the amount of torque distributed to a value smaller than the value directly proportional to the longitudinal acceleration.

4. A yaw moment control system in a vehicle, comprising left and right rear wheels as driven wheels, left and right front wheels as follower wheels, a torque distributing means for distributing torque between said left and right front wheels, a lateral acceleration calculating means for calculating the lateral acceleration of the vehicle, and a torque distribution amount determining means for controlling the amount of torque distributed by said torque distributing means, such that the torque is increased as a function of an increase in the calculated lateral acceleration, said torque distribution amount determining means lessening the increase in the amount of torque distributed to a value smaller than the value directly proportional to the lateral acceleration.

5. A yaw moment control system in a vehicle, comprising left and right front wheels as driven wheels, left and right rear wheels as follower wheels, a torque distributing means for distributing torque between said left and right rear wheels, a longitudinal acceleration calculating means for calculating the longitudinal acceleration of the vehicle, and a torque distribution amount determining means for controlling the amount of torque distributed by said torque distributing means, such that the torque is increased as a function of an increase in the calculated longitudinal acceleration, said torque distribution amount determining means further increasing the amount of torque distributed to a value larger than the value directly proportional to the longitudinal acceleration.

6. A yaw moment control system in a vehicle, comprising left and right front wheels as driven wheels, left and right rear wheels as follower wheels, a torque distributing means for distributing torque between said left and right rear wheels, a lateral acceleration calculating means for calculating the lateral acceleration of the vehicle, and a torque distribution amount determining means for controlling the amount of torque distributed by said torque distributing means, such that the torque is increased as a function of an increase in the calculated lateral acceleration, said torque distribution amount determining means further increasing the amount of torque distributed to a value larger than the value directly proportional to the lateral acceleration.

7. A yaw moment control system in a vehicle, comprising left and right rear wheels as driven wheels, left and right front wheels as follower wheels, a torque distributing means for distributing torque between said left and right rear wheels, a longitudinal acceleration calculating means for calculating the longitudinal acceleration of the vehicle, and a torque distribution amount determining means for controlling the amount of torque distributed by said torque distributing means, such that the torque is increased as a function of an increase in the calculated longitudinal acceleration, said torque distribution amount determining means lessening the increase in the amount of torque distributed to a value smaller than the value directly proportional to the longitudinal acceleration.

8. A yaw moment control system in a vehicle, comprising left and right rear wheels as driven wheels, left and right front wheels as follower wheels, a torque distributing means for distributing torque between said left and right rear wheels, a lateral acceleration calculating means for calculating the lateral acceleration of the vehicle, and a torque distribution amount determining means for controlling the amount of torque distributed by said torque distributing means, such that the torque is increased as a function of an increase in the calculated lateral acceleration, said torque distribution amount determining means lessening the increase in the amount of torque distributed to a value smaller than the value directly proportional to the lateral acceleration.

* * * * *